(12) United States Patent
Boppana et al.

(10) Patent No.: US 8,019,007 B2
(45) Date of Patent: Sep. 13, 2011

(54) DEVICE, SYSTEM, AND METHOD OF FLICKER NOISE MITIGATION

(75) Inventors: Surendra Boppana, Gainesville, FL (US); Masoud Sajadieh, Beaverton, OR (US); Hossein Alavi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 913 days.

(21) Appl. No.: 11/865,735

(22) Filed: Oct. 2, 2007

(65) Prior Publication Data

US 2009/0086866 A1    Apr. 2, 2009

(51) Int. Cl.
*H04K 1/10* (2006.01)

(52) U.S. Cl. ........ 375/260; 375/284; 375/285; 375/343; 375/348; 375/349; 375/250; 375/254; 375/278; 375/296; 375/346

(58) Field of Classification Search ................. 375/260, 375/284, 285, 343, 348, 349, 350, 250, 254, 375/278, 296, 346
See application file for complete search history.

(56) References Cited

U.S. PATENT DOCUMENTS

| | | | |
|---|---|---|---|
| 6,856,653 B1 * | 2/2005 | Taniguchi et al. | 375/285 |
| 7,191,136 B2 * | 3/2007 | Sinha et al. | 704/500 |
| 2004/0165687 A1 * | 8/2004 | Webster et al. | 375/350 |
| 2007/0110201 A1 * | 5/2007 | Mergen et al. | 375/350 |

* cited by examiner

*Primary Examiner* — Kabir A Timory
(74) *Attorney, Agent, or Firm* — Shiloh et al.

(57) ABSTRACT

Device, system, and method of flicker noise mitigation. For example, an apparatus includes a digital adaptive filter to mitigate flicker noise from a received Orthogonal Frequency-Division Multiplexing (OFDM) signal, wherein the digital adaptive filter includes: a prediction filter to estimate a value of the flicker noise based on linear combination of past low-pass filtered signal samples; a trainer sub-circuit to modify a coefficient of the prediction filter based on a difference between: a known incoming signal filtered by the prediction filter in a training stage, and a locally-generated reference copy of the known signal; a first path including a first pair of analysis-synthesis filters; and a second, parallel, path including a second pair of analysis-synthesis filters and further including the prediction filter.

10 Claims, 3 Drawing Sheets

DEVICE, SYSTEM, AND METHOD OF FLICKER NOISE MITIGATION

BACKGROUND

A wireless communication system may include a wireless communication device able to communicate with a wireless Access Point (AP). The wireless communication device may include a transmitter and a receiver; the receiver may be, for example, a Direct-Conversion Receiver (DCR) able to demodulate incoming signals using a Local Oscillator (LO) synchronized in frequency to a carrier of an incoming signal intended for reception.

Unfortunately, noise and interference may interfere with the operation of the receiver. For example, flicker noise may interfere with the operation of the DCR of the wireless communication device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements, The figures are listed below.

DETAILED DESCRIPTION

Figure 1:
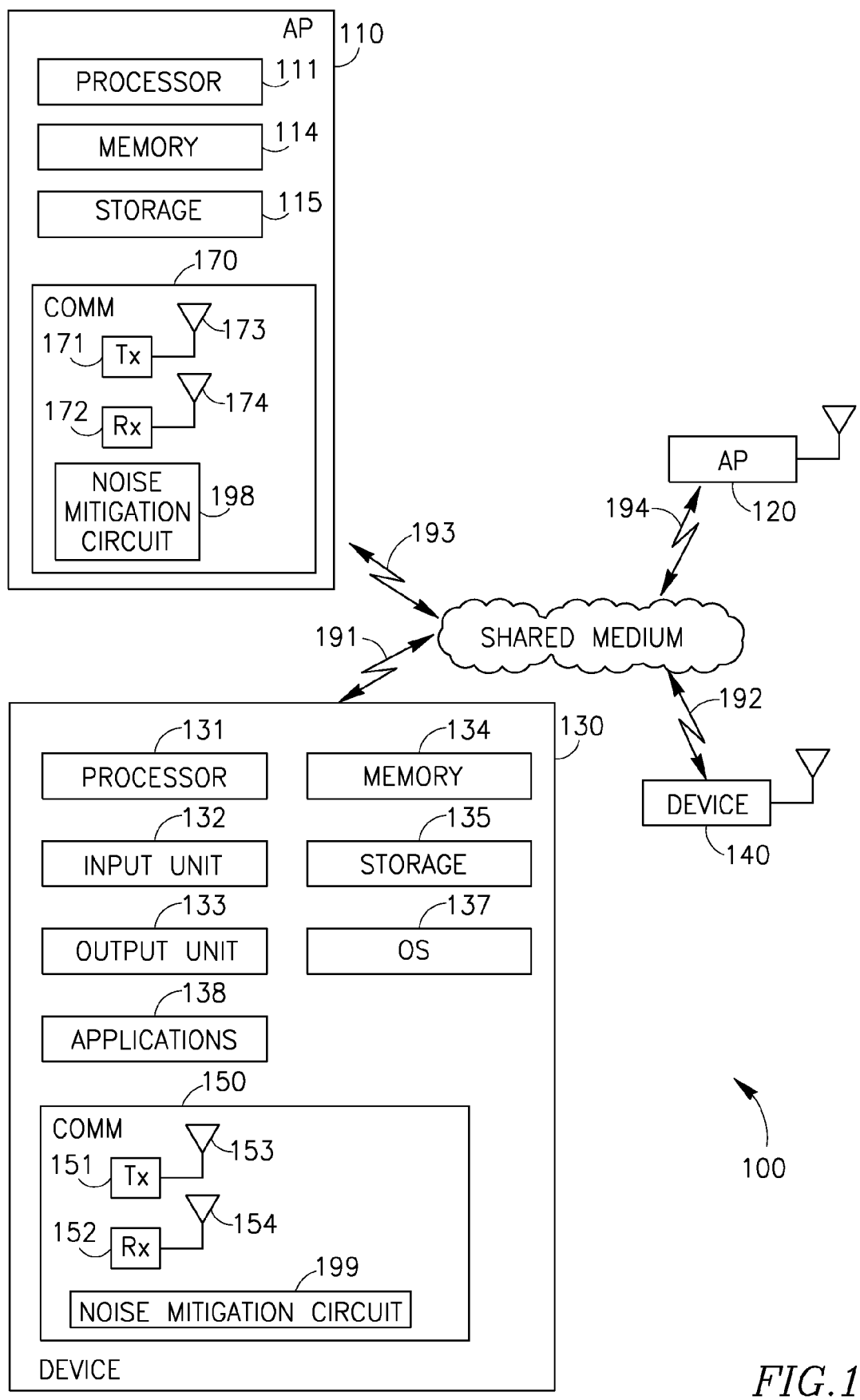
FIG. 1 is a schematic block diagram illustration of a wireless communication system in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (RTM), Global Positioning System (GPS), Wi-Fi, Wi-Max, ZigBee (TM), Ultra-Wideband (UWB), Global System for Mobile communication (GSM), 2G, 2.5G, 3G, 3.5G, or the like.

Embodiments of the invention may be used in various other devices, systems and/or networks.

The terms "Direct-Conversion Receiver" or "DCR" as used herein include, for example, able to demodulate incoming signals using a Local Oscillator (LO) synchronized in frequency to a carrier of an incoming signal intended for reception; a homodyne receiver; a synchrodyne receiver; or a zero-IF receiver.

The term "noise" as used herein includes, for example, random or non-random disturbances, patterned or non-patterned disturbances, unwanted signal characteristics, electric noise, white noise, signal distortions, shot noise, thermal noise, flicker noise, "pink" noise, burst noise, avalanche noise, noise produced by components internal to a device attempting to receive a signal, noise produced by co-existing components of a device attempting to receive a signal, noise produced by components or units external to a device attempting to receive a signal, random noise, pseudo-random noise, non-random noise, patterned or non-patterned noise, or the like.

The term "flicker noise" as used herein includes, for example, non-white noise, pink noise, 1/f noise, "one-over-f noise", a noise having a frequency spectrum such that the power spectral density is substantially proportional to the reciprocal of the frequency, a noise resulting from impurities in a conductive channel, generation noise, recombination noise, transistor noise due to base current, noise generated by or related to a Direct Current (DC), a low-frequency noise, excess noise, or the like.

The term "mitigation" (e.g., of noise or flicker noise) as used herein includes, for example, reduction, decrease, lessening, elimination and/or removal.

Although portions of the discussion herein may relate, for demonstrative purposes, to mitigation of flicker noise, some embodiments of the invention may be used for mitigation of other types of noise or interference.

Although portions of the discussion herein may relate, for demonstrative purposes, to mitigation of flicker noise in conjunction with a DCR or with DCR architecture, some embodiments of the invention may be used in conjunction with other types of receivers and/or with other types of architectures.

Although portions of the discussion herein may relate, for demonstrative purposes, to mitigation of flicker noise in an OFDM communication system, in an IEEE 802.11 communication system, or in an IEEE 802.16 communication system, some embodiments of the invention may be used in conjunction with other types of communication systems, standards and/or protocols.

FIG. 1 schematically illustrates a block diagram of a wireless communication system 100 in accordance with some demonstrative embodiments of the invention. System 100 may include, one or more wireless communication devices, for example, wireless communication devices 130 and 140, as well as one or more wireless Access Points (APs), for example, APs 110 and 120. The components of system 100 may communicate using a shared medium 190, for example, using wireless links 191-194.

Device 130 and/or device 140 may be or may include, for example, a mobile phone, a cellular phone, a handheld device, a computing device, a computer, a Personal Computer (PC), a server computer, a client/server system, a mobile computer, a portable computer, a laptop computer, a notebook computer, a tablet computer, a network of multiple inter-connected devices, or the like.

Device 130 may include, for example, a processor 131, an input unit 132, an output unit 133, a memory unit 134, a storage unit 135, and a communication unit 150. Device 130 may optionally include other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any others suitable multi-purpose or specific processor or controller. Processor 111 executes instructions, for example, of an Operating System (OS) 137 of device 130 or of one or more applications 138.

Input unit 112 includes, for example, a keyboard, a keypad, a mouse, a touch-pad, a track-ball, a stylus, a microphone. Or other suitable pointing device or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a Digital Versatile Disk (DVD) drive, or other suitable removable or non-removable storage units Memory unit 114 and/or storage unit 115, for example, store data processed by device 130.

Communication unit 150 includes, for example, a wireless transceiver, a wireless modem, a wireless Network Interface Card (NIC), or the like. For example, communication unit 150 includes a transmitter 151 and a receiver 152.

Transmitter 151 includes, for example, a wireless Radio Frequency (RF) transmitter able to transmit wireless RF signals, blocks, frames, transmission streams, packets, messages and/or data, e.g., through an antenna 153.

Receiver 152 includes, for example, a wireless Radio Frequency (RF) receiver able to receive wireless RF signals, blocks, frames, transmission streams, packets, messages and/or data, e.g., through an antenna 154.

Optionally, transmitter 151 and receiver 152 may be implemented using a transceiver, a transmitter-receiver, or other suitable component. Optionally, antenna 153 and antenna 154 may be implemented using a common antenna, a common set of multiple antennas, or other suitable component(s). For example, antenna 153 and/or antenna 154 may include an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some embodiments, some or all of the components of device 130 may be enclosed in a common housing or packaging, and may be interconnected or operably associated using one or more wired or wireless links. In other embodiments, components of device 130 may be distributed among multiple or separate devices or locations.

AP 110 and/or AP 120 may be or may include, for example, a wireless AP, a wireless Base Station (BS), a wireless controller; a wireless router, a component of an ad-hoc network operating as an AP or a router, an AP of a Basic Service Set (BSS), a device operating as AP in an Independent BSS (IBSS), an AP or a device able to connect among multiple wireless communication devices, a device able to form a wireless communication network, a device able to relay among wireless communication devices, or the like.

AP 110 may include, for example, a processor 111, a memory unit 114, a storage unit 115, and a communication unit 170. The communication unit 170 may include, for example, a transmitter 171 associated with an antenna 173, and a receiver 172 associated with an antenna.

Device 140 may include components similar, in properties and/or in functionality, to the components of device 130, AP 120 may include components similar, in properties and/or in functionality, to the components of AP 110.

Figure 2:
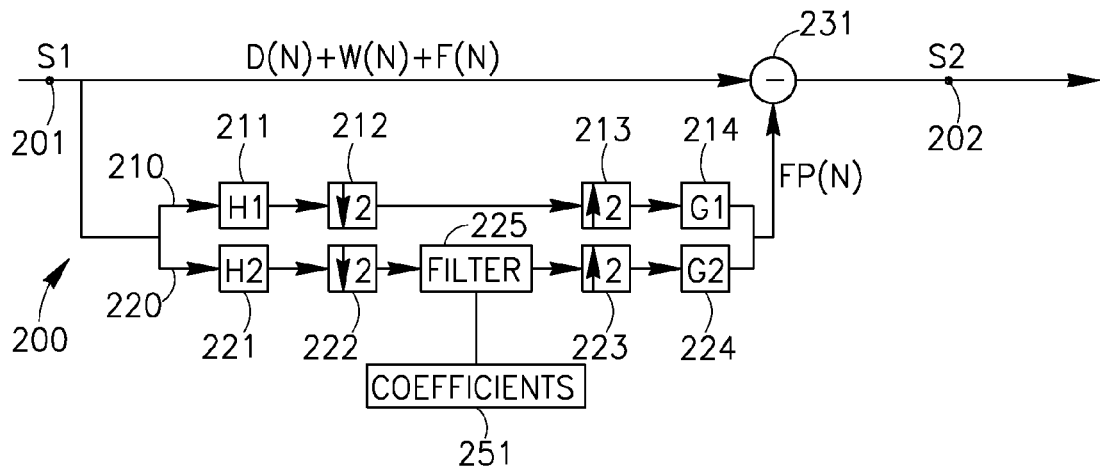
FIG. 2 is a schematic block diagram illustration of a flicker noise mitigation circuit in accordance with a demonstrative embodiment of the invention.
Figure 3:
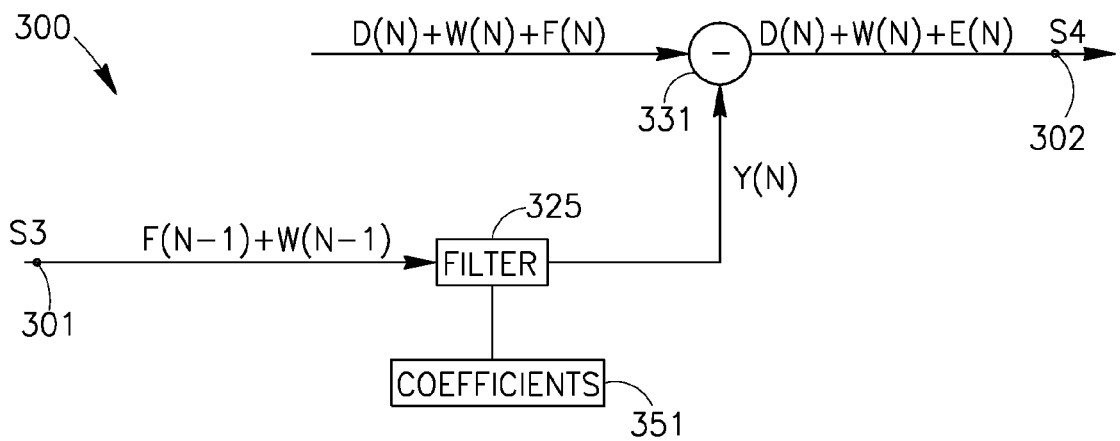
FIG. 3 is a schematic block diagram illustration of a flicker noise mitigation circuit in accordance with another demonstrative embodiment of the invention.
Figure 4:
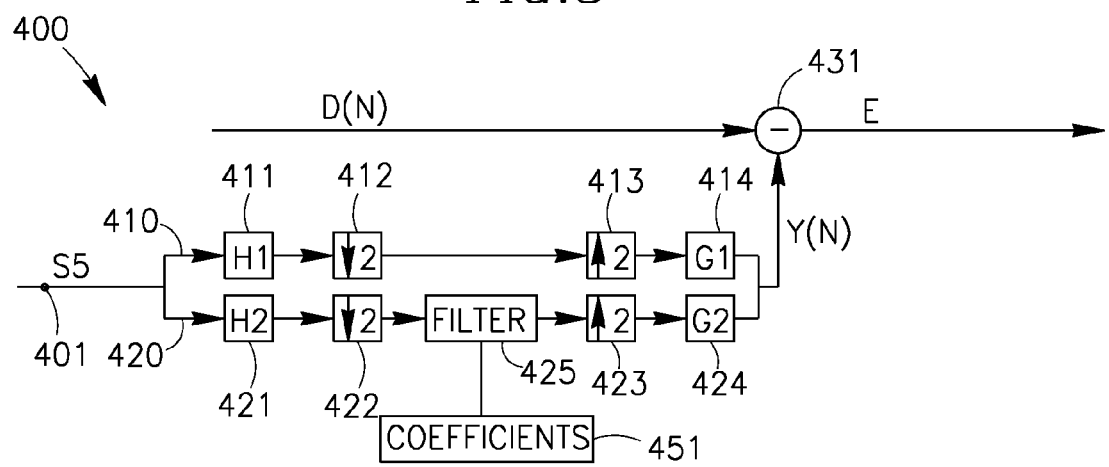
FIG. 4 is a schematic block diagram illustration of a flicker noise mitigation circuit in accordance with yet another demonstrative embodiment of the invention.

In some embodiments, device 130 may include a noise mitigation circuit 199, for example, utilizing adaptive digital filtering For example, noise mitigation circuit 199 may include one or more circuits, for example, similar to circuit 200 of FIG. 2, circuit 300 of FIG. 3, circuit 400 of FIG. 4, and/or other suitable circuits or components.

Similarly, AP 110 may include a noise mitigation circuit 198, for example, utilizing adaptive digital filtering. For example, noise mitigation circuit 198 may include one or more circuits, for example, similar to circuit 200 of FIG. 2, circuit 300 of FIG. 3, circuit 400 of FIG. 4, and/or other suitable circuits or components.

FIG. 2 schematically illustrates a block diagram of a flicker noise mitigation circuit 200 in accordance with some demonstrative embodiments of the invention For example, circuit 200 may be included in noise mitigation circuit 199 or in noise mitigation circuit 198 of FIG. 1.

Circuit 200 receives at an entry node 201 an incoming signal (e.g., received from a Digital Front End (DFE) after processing by the DFE), utilizes a prediction filtering scheme, and outputs an output signal at an exit node 202 (e.g., transferred to a baseband module or component).

The incoming signal (denoted Si) at the entry node 201 may be substantially equal to the sum of multiple components, for example: a desired signal component (namely, the signal intended for reception, denoted $d(n)$); a white noise component (denoted $w(n)$); and an actual flicker noise component (denoted $f(n)$).

The outgoing signal (denoted S2) at the exit node 202 may be substantially equal to the sum of multiple components, for example: a desired signal component (namely, the signal intended for reception, denoted $d(n)$); an optional white noise component (denoted $w(n)$); and a residual flicker noise component (denoted $e(n)$).

The incoming signal (S1) is transferred to two parallel paths 210 and 220. The first path 210 includes a high-pass filter 211 for analysis, a down-sampling module or component 212 (e.g., to down-sample the signal by a factor of two), an up-sampling module or component 213 (e.g., to up-sample the signal by a factor of two), and a synthesis filter 214. The second path 220 includes a low-pass filter 221 for analysis, a down-sampling module or component 222 (e.g., to down-sample the signal by a factor of two), a prediction filter 225, an up-sampling module or component 223 (e.g., to up-sample the signal by a factor of two), and a synthesis filter 224.

The prediction filter 225 utilizes correlation properties of the flicker noise, and generates an estimate of the present value of the flicker noise as a linear combination of past flicker noise samples, or based on past low-pass filtered signals. For example, the output of the second path 220 is a predicted flicker noise, denoted $fp(n)$.

The prediction filter 225 performs a dual-stage prediction process, for example, a training stage followed by a filtering stage. During the training stage, a known signal (denoted $d(n)$) is transmitted by another device (e.g., a remote transmitter); the known signal is corrupted by flicker noise (denoted $f(n)$) and optionally by white noise (denoted $w(n)$); the signal is filtered, and output of the prediction filter 225 is subtracted (using a subtractor 231) from the incoming signal. The output of subtractor 231 is compared against a locally-generated reference copy of the known signal (e.g., generated by a local Reference Signal Generator (RSG)). The error or difference between these two signals is used by a trainer sub-circuit to train and/or to adaptively modify one or more coefficients 251 of the prediction filter 225. Upon completion of the training stage, the prediction filter coefficients 225 are set and maintained unmodified or "frozen".

During the filtering stage, the received signal is filtered through the prediction filter 225 which generates an estimate of the flicker noise present in the present sample (denoted $fp(n)$). A subtractor 231 receives through a path 230 the incoming signal sample (S1), and subtracts therefrom the predicted flicker noise value (denoted $fp(n)$), to generate the output signal (S2).

The performance of prediction filter 225 may depend on the availability of past flicker noise samples. In some embodiments, it may be difficult to retrieve noise-only samples; for example, in some OFDM systems where a Fast Fourier Transform (FFT) block results in a "whitening" of flicker noise present in the received signal Accordingly, the prediction filter 225 may utilize previous received samples that include both data and noise (white noise and flicker noise) as an estimate of previous noise-only samples. The prediction may be improved by using a sequence or banks or pairs of analysis-synthesis filters (e.g., components 211, 214, 221 and 224), and/or by selectively applying the prediction filtering only to the particular sub-band in which flicker noise dominates both the data signal and the white noise (namely, where the flicker noise is greater than the data signal and/or the white noise). In some embodiments, this approach may result in a significant performance gain with regard to lower sub-carriers in an OFDM system where flicker noise is the dominant source of noise (namely, where the flicker noise is greater than the data signal and/or the white noise).

FIG. 3 schematically illustrates a block diagram of a flicker noise mitigation circuit 300 in accordance with some demonstrative embodiments of the invention. For example, circuit 300 may be included in noise mitigation circuit 199 or in noise mitigation circuit 198 of FIG. 1.

Circuit 300 includes a filter 325 (e.g., a prediction filter, a Wiener filter, or other suitable filter), and operates to reduce the amount of noise present in an incoming signal by generating an estimate of the noise component from past samples of the noise signal, and subtracting it from the received signal (which includes the desired signal and noise components). Filter 325 operates, for example to minimize the mean square error between the present noise signal and the predicted noise signal.

For example, the filter 325 receives an incoming signal (denoted S3) at an entry node 301, which may be substantially equal to the sum of multiple components, for example: past values of the flicker noise signal (denoted $f(n-1)$), and past values of white noise (denoted $w(n-1)$).

The filter 325 outputs a filtered signal (denoted $y(n)$) which may be substantially equal to the sum of the predicted flicker noise component (denoted $fp(n)$) and an optional white noise component (denoted $w(n)$). A subtractor 331 receives the incoming signal, which may be substantially equal to the sum of multiple components, for example: a desired signal (denoted $d(n)$); an optional white noise component (denoted w(n)); and an actual flicker noise component (denoted f(n)). The subtractor 331 subtracts the filtered signal (denoted y(n)) from the input signal, to generate an output signal (denoted S4) at an exit node 302. The output signal (S4) may be substantially equal to the sum of: the desired signal (denoted d(n)); an optional white noise component (denoted w(n)); and a residual flicker noise component (denoted e(n)). The output signal (S4) may optionally be used by a trainer sub-circuit to train or to adaptively modify one or more coefficients 351 of the filter 325.

FIG. 4 schematically illustrates a block diagram of a flicker noise mitigation circuit 400 in accordance with some demonstrative embodiments of the invention. For example, circuit 400 may be included in noise mitigation circuit 199 or in noise mitigation circuit 198 of FIG. 1. Circuit 400 utilizes sub-band Wiener filtering for mitigation of flicker noise.

An incoming signal (denoted S5) at an entry node 401 may be substantially equal to the sum of multiple components, for example: a desired signal component (namely, the signal intended for reception, denoted d(n)); an optional white noise component (denoted w(n)); and an actual flicker noise component (denoted f(n)).

The incoming signal (S5) is transferred to two parallel paths 410 and 420. The first path 410 includes a high-pass filter 411 for analysis, a down-sampling module or component 412 (e.g., to down-sample the signal by a factor of two), an up-sampling module or component 413 (e.g., to up-sample the signal by a factor of two), and a synthesis filter 414. The second path 420 includes a low-pass filter 421 for analysis, a down-sampling module or component 422 (e.g., to down-sample the signal by a factor of two), a filter 425 (e.g., a Wiener filter or a prediction filter), an up-sampling module or component 423 (e.g., to up-sample the signal by a factor of two), and a synthesis filter 424.

The Wiener filter 425 performs a dual-stage filtering process, for example, a training stage followed by a filtering stage. During the training stage, a known signal (denoted d(n)) is transmitted by another device (e.g., a remote transmitter); the known signal is corrupted by flicker noise (denoted f(n)) and optionally by white noise (denoted w(n)); the signal is filtered, and output of the Wiener filter 425 is subtracted by a subtractor 431. The output of the subtractor 431 is compared against a locally-generated reference copy of the known signal (e.g., generated by a local Reference Signal Generator (RSG)). The error or difference (denoted e) between these two signals (namely, the difference d(n)−y(n) produced by subtractor 431) may be used by a trainer sub-circuit to train and to adaptively modify one or more coefficients 451 of the filter 425. Upon completion of the training stage, the coefficients 451 of the filter 425 are set and maintained substantially unmodified or "frozen". During the filtering stage, the received signal is filtered through the filter 425, subtracted from the incoming signal by subtractor 431, and the output is passed to a subsequent stage in the receiver chain.

The performance of filter 425 may depend on the amount of flicker noise in the received signal, which in turn is characterized by the corner frequency of the flicker noise. The filtering performance may be improved by selectively applying a sub-band filtering scheme, as shown in FIG. 4. For example, a sequence or banks or pairs of analysis-synthesis filters (e.g., components 411, 414, 421 and 424) are used in conjunction with the Wiener filter 425 such that filtering is applied to the particular sub-band where flicker noise is the dominant source of noise. In some embodiments, this approach may result in a significant performance gain with regard to lower sub-carriers in an OFDM system. In some embodiments, the analysis-synthesis filters (e.g., components 411, 414, 421 and 424) are adapted or selected to result in a significant performance improvement with negligible increase in hardware complexity and tolerable implementation delay.

Figure 5:
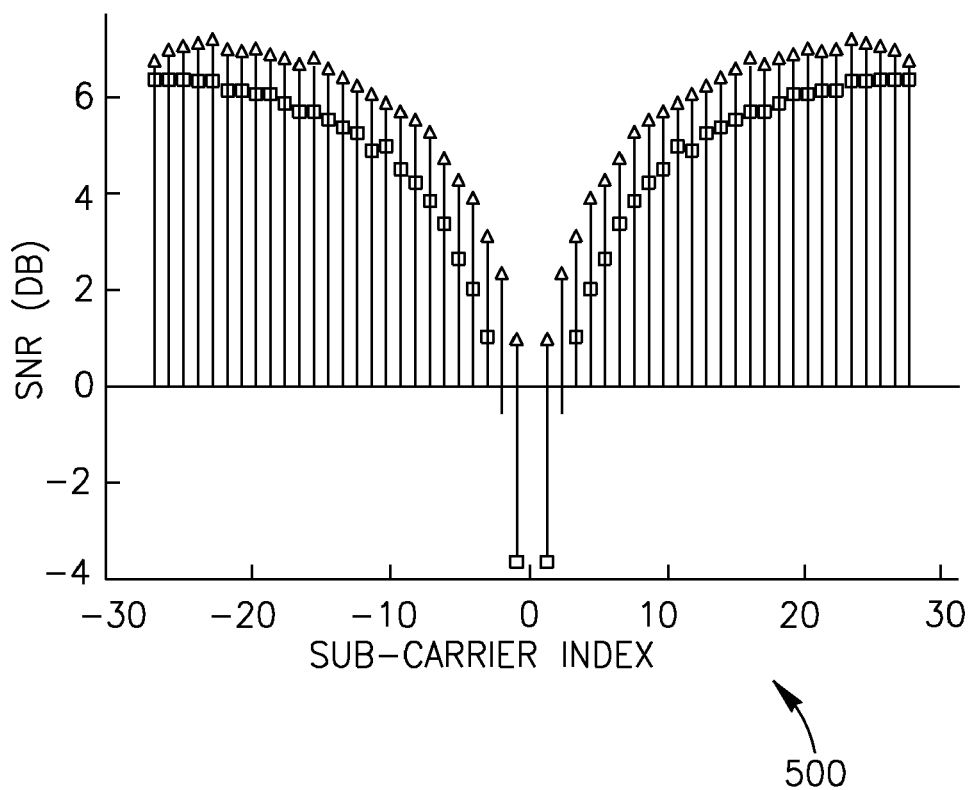
FIG. 5 is a schematic block diagram illustration of a chart of Signal to Noise Ratio (SNR) values of sub-carries, generated in accordance with a demonstrative embodiment of the invention.

FIG. 5 schematically illustrates a chart 500 of Signal to Noise Ratio (SNR) values of sub-carriers, generated in accordance with some demonstrative embodiments of the invention. Chart 500 is associated, for example, with an IEEE 802.11a communication system utilizing DCR architecture and adaptive filtering of flicker noise.

In chart 500, the vertical axis indicates SNR values (e.g., in dB), whereas the horizontal axis indicates sub-carriers (e.g., according to a sub-carrier index). In chart 500, squares are associated with a received (e.g., non-filtered) signal, whereas triangles are associated with a filtered signal (e.g., using Wiener filtering of flicker noise having a flicker corner frequency of 2 MHz).

In some embodiments, as demonstrated in chart 500, maximum performance improvement is realized over sub-carriers close to zero. In some embodiments, the SNR improvement increases as the amount of flicker noise in the system increases.

Figure 6:
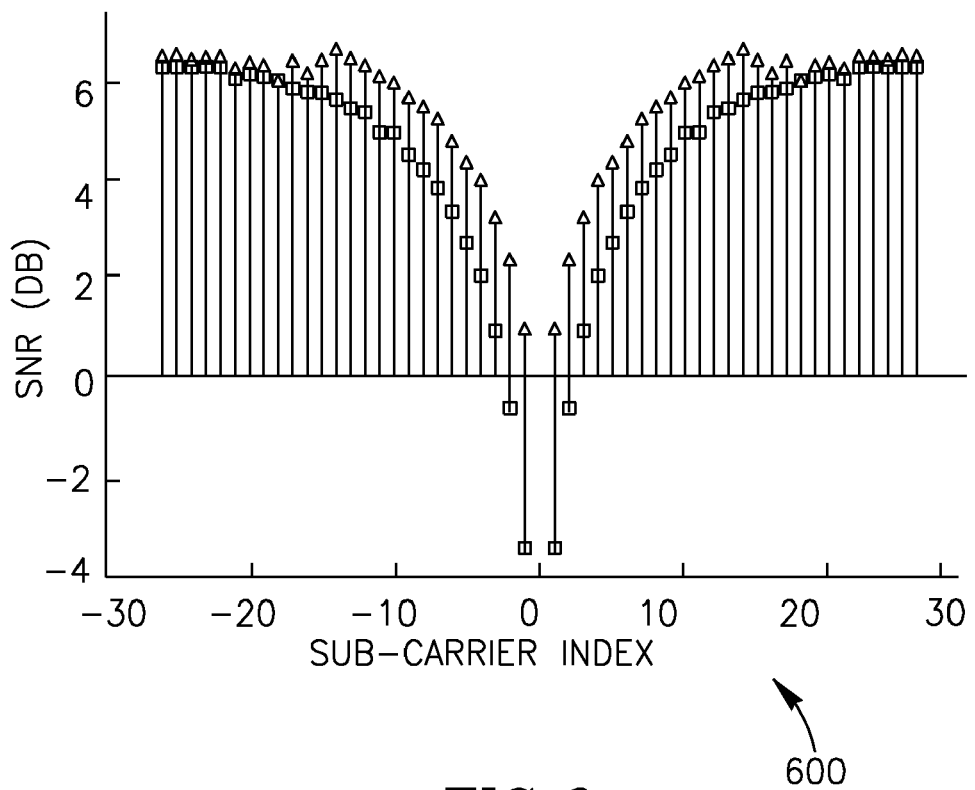
FIG. 6 is a schematic block diagram illustration of a chart of Signal to Noise Ratio (SNR) values of sub-carriers, generated in accordance with another demonstrative embodiment of the invention.

FIG. 6 schematically illustrates a chart 600 of Signal to Noise Ratio (SNR) values of sub-carriers, generated in accordance with some demonstrative embodiments of the invention. Chart 600 is associated, for example, with an IEEE 802.11a communication system utilizing DCR architecture and adaptive filtering of flicker noise.

In chart 600, the vertical axis indicates SNR values (e.g., in dB), whereas the horizontal axis indicates sub-carriers (e.g., according to a sub-carrier index). In chart 600, squares are associated with a received (e.g., non-filtered) signal, whereas triangles are associated with a filtered signal (e.g., using sub-band Wiener filtering of flicker noise having a flicker corner frequency of 5 MHz).

In some embodiments, as demonstrated in chart 600, maximum performance improvement is realized over sub-carriers close to zero. In some embodiments, the SNR improvement increases as the amount of flicker noise in the system increases.

Some embodiments may include a method of mitigating flicker noise, for example, using an adaptive filtering scheme. The method may include performing a training stage to set coefficient values of an adaptive filter (e.g., a prediction filter, a sub-band prediction filter, a Wiener filter, or a sub-band Wiener filter), for example, using a sequence of analysis-synthesis components. Then, the method may include performing a filtering stage to mitigate or remove flicker noise.

Other suitable operations may be used, and other suitable orders of operation may be used.

In some embodiments, a Least-Mean Square (LMS) variant of filtering scheme may be used, for example, to reduce hardware complexity and/or to improve performance. The filter length and/or convergence parameters may be selected or adapted, for example, such that training of the filter coefficients is accomplished during the preamble period of an OFDM packet, and/or to meet target performance requirements during the filtering stage.

In some embodiments, flicker noise mitigation through adaptive digital filtering may provide, for example, design robustness and operational flexibility, and may be used in conjunction with low-power implementations. In some embodiments, the digital architecture allows flexible operation across multiple channel profiles and radio standards with low power consumption. In some embodiments, the adaptive digital filtering may mitigate a burden of stringent design rules of RF architectures having very low flicker noise impairment. In some embodiments, particularly at low operating SNR values, the adaptive digital filtering may retrieve a small number of low sub-carriers of the OFDM multiplex.

In some embodiments, digitally-enhanced DCR architecture may utilize the adaptive digital filtering for mitigation of flicker noise. Such utilization may be reflected, for example, in the Error Vector Magnitude (EVM) per sub-carrier, particularly on the lower sub-carriers. In some embodiments, adaptive digital filtering may be used for mitigation of flicker noise in addition to, or instead of, analog techniques for flicker noise reduction.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc,) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or, more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a digital adaptive filter to mitigate flicker noise from a received Orthogonal Frequency-Division Multiplexing (OFDM) signal, wherein the digital adaptive filter comprises:
a first path comprising a first pair of analysis-synthesis filters to process the received OFDM signal;
a second path, to process the received OFDM signal in parallel to the first path, comprising
a second pair of analysis-synthesis filters and a prediction filter to estimate a present value of the flicker noise as linear combination of past flicker noise samples; and
a trainer sub-circuit to modify a coefficient of the prediction filter based on a difference between: a known incoming signal, which was filtered by the prediction filter in a training stage, and a locally-generated reference copy of the known signal.

2. The apparatus of claim 1, wherein the first pair of analysis-synthesis filters comprises a high-pass filter and a first synthesis filter, and wherein the second pair of analysis-synthesis filters comprises a low-pass filter and a second synthesis filter.

3. The apparatus of claim 1, wherein the digital adaptive filter comprises a subtractor to subtract the estimated flicker noise value from a sample of the received signal.

4. The apparatus of claim 1, wherein the prediction filter is to selectively filter one or more sub-bands of the received signal in which flicker noise is greater than at least one of: data signal and white noise.

5. The apparatus of claim 1, comprising a processor to process incoming OFDM wireless communication signals.

6. The apparatus of claim 1, wherein the apparatus comprises a device selected from a group consisting of: a receiver, a Direct-Conversion Receiver, a wireless communication device, a wireless communication station, a wireless Access Point, and a wireless Base Station.

7. A method including:
receiving an Orthogonal Frequency-Division Multiplexing (OFDM) signal; and
using a digital adaptive filter to remove at least a portion of flicker noise from a digital signal corresponding to the received OFDM signal,
wherein the digital adaptive filter comprises a first path including a first pair of analysis-synthesis filters to process the received OFDM signal, the first pair of analysis-synthesis filters comprising a first analysis filter, a down sampling module to down-sample an output of the first analysis filter, an up sampling module to up-sample an output of the down sampling module and a first synthesis filter to filter an output of the up sampling module;
a second path, to process the received OFDM signal in parallel to the first path, the second path including a second pair of analysis-synthesis filters and a noise-mitigation filter connected between the second pair of analysis-synthesis filters; and a trainer sub-circuit to modify a coefficient of the noise-mitigation filter based on a difference between:
a known incoming signal, which was filtered by the noise-mitigation filter in a training stage, and a locally-generated reference copy of the known signal.

8. The method of claim 7, wherein the noise-mitigation filter includes a Wiener filter or a prediction filter.

9. The method of claim 7, wherein the first analysis filter comprises a high-pass filter, and wherein the second pair of analysis-synthesis filters comprises a low-pass filter and a second synthesis filter.

10. The method of claim 7, wherein removing at least a portion of the flicker noise from the digital signal includes removing at least a portion of the flicker noise over one or more sub-bands of the received OFDM signal in which flicker noise is greater than at least one of a data signal and white noise.

* * * * *

UNITED STATES PATENT AND TRADEMARK OFFICE
CERTIFICATE OF CORRECTION

| | | |
|---|---|---|
| PATENT NO. | : 8,019,007 B2 | |
| APPLICATION NO. | : 11/865735 | |
| DATED | : September 13, 2011 | |
| INVENTOR(S) | : Surendra Boppana et al. | |

It is certified that error appears in the above-identified patent and that said Letters Patent is hereby corrected as shown below:

In column 10, line 17, in claim 1, before "linear" insert -- a --.

Signed and Sealed this
Third Day of January, 2012

David J. Kappos
*Director of the United States Patent and Trademark Office*